2 Sheets—Sheet 1.
Asa T. Brooks.
Locking Knob Latches.
Nº 92,152.        Patented July 6, 1869.
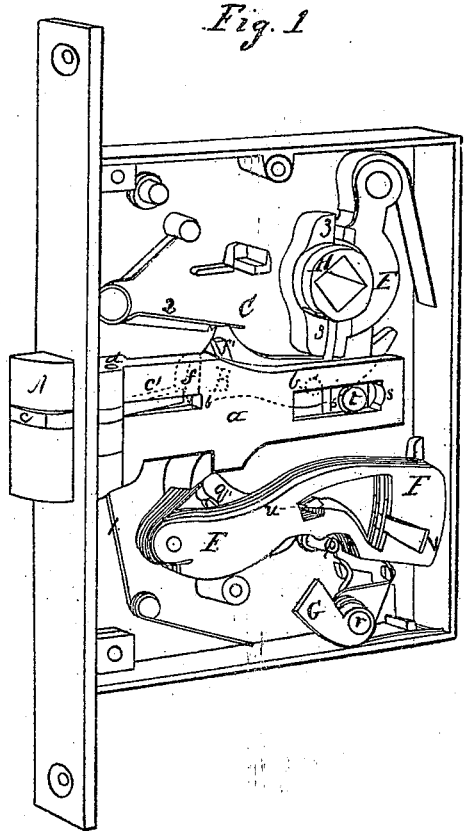
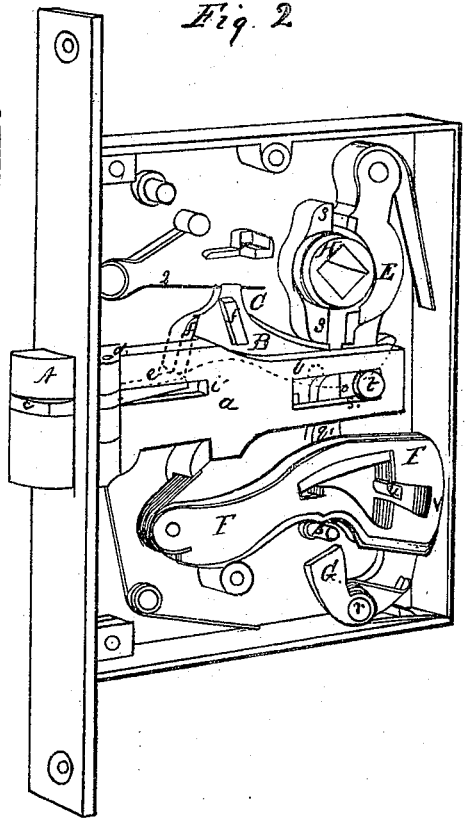
Witnesses        Inventor
Asa T. Brooks
Atty 2 Sheets—Sheet 2.
Asa T. Brooks.
Locking Knob Latches.
No. 92,152.     Fig. 3.     Patented July 6. 1869.
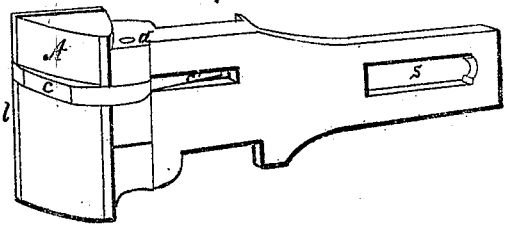
Fig. 8.
Fig. 9.
Fig. 4.
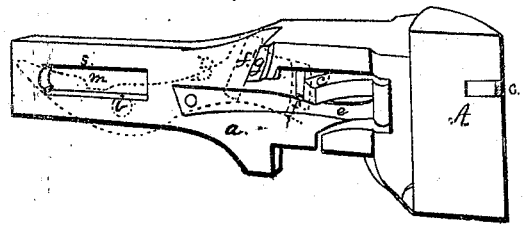
Fig. 5.
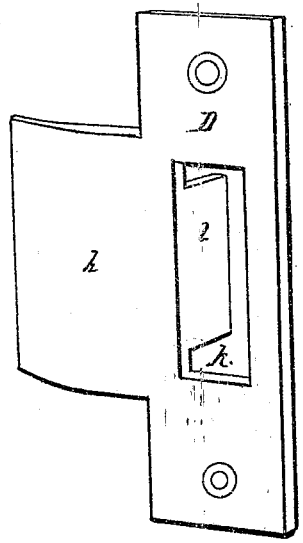
Fig. 6.
Fig. 7.
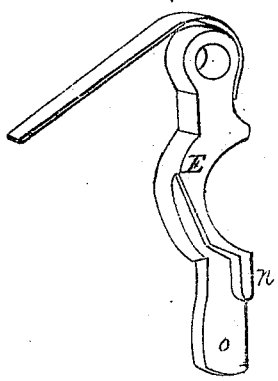
Witnesses
Fred B Swan
H Holdridge
Inventor
Asa T. Brooks
per J D Law
Atty

UNITED STATES PATENT OFFICE.

ASA T. BROOKS, OF NEW BRITAIN, CONNECTICUT, ASSIGNOR TO RUSSELL AND ERWIN MANUFACTURING COMPANY, OF SAME PLACE.

Letters Patent No. 92,152, dated July 6, 1869.

IMPROVEMENT IN KNOB-LATCHES.

The Schedule referred to in these Letters Patent and making part of the same.

*To all whom it may concern:*

Be it known that I, ASA T. BROOKS, of New Britain, in the county of Hartford, and State of Connecticut, have invented certain new and useful Improvements in Locking Knob-Latches; and I do hereby declare that the following is a full, clear, and exact description thereof, and of their mode or manner of operation, reference being had to the accompanying drawings, and to the letters of reference marked thereon, and making a part of this specification.

The nature of my invention or improvements in knob-latches consists in a peculiar construction of the latch, and in the arrangement and combination therewith of mechanism, by which the latch is locked whenever it is shot forward or projects out of the case, but which locking-mechanism is displaced or moved by the act of shutting the door, so as to permit the latch to move backward within the case.

Figure 1 shows the position of the latch and the locking-plate or lever, when the door is open, the latch being locked.

Figure 2 shows the position of the locking-plate as raised by the knob-lever through the medium of the key-bar or knob, so as to permit the latch to be carried back and the door opened.

Figure 3 is a detached view of the main latch, and the small spring-latch within it from the top.

Figure 4 is a view of the main and supplemental latch from the bottom or under side.

Figure 5 is a detached view of the striking-plate.

Figure 6 is a detached view of the locking-plate or lever.

Figure 7 is a view of the knob-lever.

Figures 8 and 9 represent the divided hub.

The main latch A, which can be operated by the knob, as in other knob-latches, is in its general shape and construction substantially like ordinary latches, and is thrown and kept forward in the position shown in fig. 1, or within the striking-plate when the door is shut, by means of the spring 1.

The locking-mechanism, for locking or fastening such latch A, when it is thrown forward by the spring 1, consists of a plate or lever, B, which lies partially behind the plate $a$ of the latch A, and upon the inside of the case-plate C, and which turns upon a pin or stud, $b$, projecting from such case-plate. A full-sized representation of such locking-plate or lever is shown in fig. 6.

In the front end of the main latch A, is a bar or lever, $c\ c'$, which forms a sort of supplemental latch, and which turns on a pin, $d$, in the main latch, and is given the position shown in figs. 1, 2, 3, that is, its forward end $c$ projecting somewhat beyond the inclined face of the main latch, by means of a spring, $e$, shown in fig. 4, which is fixed to the under side of the plate $a$. When in such position, the inner end $c'$ of such bar stands out or projects from the under surface of the latch-plate $a$, as shown by the dotted lines in figs. 1 and 2, and more plainly in fig. 4, and furnishes a shoulder, against which the end of the locking-plate B rests, when in the position shown in figs. 1 and 4.

On the front end of such locking-plate B are also two inclined projections, $f\ f'$, between which lies a projection, $g$, on the under side of the latch-plate $a$.

The operation of the latch A and its locking-mechanism, is as follows:

When the door is open, the latch A is shot forward by the spring 1, in the position shown in figs. 1 and 2, and the supplemental latch-bar $c\ c'$ is, by the action of its spring $e$, given the position shown in figs. 1 and 2, and the locking-plate B is behind the end $c'$ of such supplemental latch-bar, being more certainly carried to such position by the action of the spring 2. When the several parts are in such position, the latch A cannot be pushed back within the case.

As the door is closed, the end $c$, of the latch-bar $c\ c'$, first strikes against the lip $h$ of the striking-plate D, and is forced back into and through the inclined end of the main latch, thereby carrying the inner end $c'$ in an opposite direction, or out into the slot $i$ in the latch-plate $a$, and away from the end of the locking-plate B. This new position of such bar $c\ c'$ permits the latch A to move backward into the case, as its inclined face comes in contact with the lip $h$ of the striking-plate, and as it is thus moved back, the projection $g$ upon it, fig. 4, acts against the inclined projection $f'$ on the locking-plate, and elevates the front end of such plate above the line of the latch-bar $c\ c'$, into the position shown in fig. 2.

When the door is fully closed, the main latch A is shot forward into the recess $k$ in the striking-plate D, by the spring 1, and the latch-bar $c\ c'$ is, by its spring $e$, again given the position shown in figs. 1 and 2, and the front end of the locking-plate B is carried down by the spring 2, behind the end $c'$ of the latch-bar, and the main latch thus locked.

A right-angled lip, $l$, on the striking-plate D, and against which, when the door is closed, the latch A rests, as shown in fig. 3, prevents the end $c$, of the latch-bar $c\ c'$, being pressed, by any means, down into and through the inclined end of the main latch, so as to move the other end away from or out of contact with the locking-plate B, and thus render it possible to move the main latch back within the case.

The latch A is released from the locking-plate B by the action of the key, so as to allow the door to be opened, in the following manner:

The rear end of the locking plate B is shaped as shown in fig. 6, and has in its upper edge a recess, $m$, in which rests a spur, $n$, on the knob-lever E, the lower end $o$ of such lever lying over and extending below the end of the locking-plate B.

The key being inserted in the lock on the stem $p$, and turned, presses against the bar $q$, which turns on a pivot, $r$, and carries such bar along until its end strikes against the lower end $s$ of the knob-lever. As the key is further turned, such bar $q$ moves backward the end $o$ of the knob-lever, and carrying the point or spur $n$ out of the recess $m$, and along the upper edge of the end of the locking-plate B, presses down that end, and consequently raises the other, or front end of such locking-plate, above and away from the end $c'$ of the latch-bar $c\ c'$. The latch A is thus permitted to be moved back by the further movement of the key and knob-lever.

As the first movement backward of the knob-lever, when actuated by the key-bar $q$, is required to elevate the front end of the locking-plate or lever B, there is a slot, $s$, in the latch-plate $a$, to allow the stud $t$, on the knob-lever, to move back far enough to sufficiently elevate the locking-plate, before the stud $t$ on the knob-lever begins to act upon the latch to carry it backward.

As soon as the latch is carried back out of the striking-plate, so as to permit the door to be opened, the main latch is again forced out by the spring 1, and the locking-plate again falls down behind the end of the latch-bar $c\ c'$, by the action of the spring 2.

The drawing shows a series of guards, F, within the latch-case, which are severally acted upon by different parts or wards of the key, and in combination therewith a stem, $u$, on the key-bar $q$, so arranged that the latch cannot be moved by any key except by such a one as shall so place the several guards that the stem $u$ can pass into a recess, $v$, in all of such guards, before operating the knob-lever or locking-plate; and such drawings also show a key-hole guard, G, which is so connected with the key-bar $q$, as to close the key-hole when the key is turned; but these devices, though adding security to the latch against being picked, do not in any way affect the action of the locking-mechanism.

The construction of the divided hub H is peculiar, only one part or half of such hub being provided with arms 3 3, to act upon the knob-lever E, instead of both parts of the hub having arms, as generally heretofore constructed. The part of the hub thus furnished with arms, is the inner portion, shown in fig. 8, or that with which the knob on the inside of the door is connected by means of the spindle, and consequently as such knob is turned, the knob-lever will be operated, and the locking-plate raised, and the latch drawn back. The other or outer portion of the hub, fig. 9, and with which the outside knob of the door is connected, rests upon and partly within the inner portion, in a sort of socket, shown in fig. 8, but can turn or revolve freely in either direction upon such inner portion.

The spindle used is the ordinary swivel spindle.

As the outer part of the hub, fig. 9, has no arms, the outside knob can be turned in either direction, and round and round, without in any degree affecting the latch, which can only be moved from without, by means of the key, while, from within, the latch can be drawn back, and the door opened by means of the knob alone.

What I claim as my invention, and desire to secure by Letters Patent, is—

1. The combination, with the latch-bolt A and latch-bar $c\ c'$, arranged as described, of the locking plate B, the several parts being constructed and operating substantially as described.

2. The arrangement of the projection $g$ on the lock-bolt A, and the projections $f\ f$ on the locking-plate B, substantially as and for the purposes described.

3. The combination, with the latch-bolt A, supplemental latch-bar $c\ c'$, and locking-plate B, constructed and arranged as described, of the knob-lever and key-bar $q$, substantially as and for the purposes set forth.

4. In combination with the latch-bolt A, having within it the supplemental latch-bar $c\ c'$, the arrangement of a striking-plate with a right-angled lip, $l$, or its equivalent, substantially as and for the purposes set forth.

5. In combination with the latch-bolt A and supplemental latch-bar $c\ c'$, locking-plate B, and knob-lever E, the construction and arrangement of the divided hub H, substantially as and for the purposes set forth.

ASA T. BROOKS.

Witnesses:
M. J. WOODRUFF,
M. S. WIARD.